US011961309B2

(12) United States Patent
Lee et al.

(10) Patent No.: US 11,961,309 B2
(45) Date of Patent: Apr. 16, 2024

(54) VEHICLE AND CONTROL METHOD THEREOF

(71) Applicants: Hyundai Motor Company, Seoul (KR); Kia Motors Corporation, Seoul (KR)

(72) Inventors: Hayeon Lee, Gwacheon-si (KR); JongHoon Kwak, Goyang-si (KR); Jinwook Choi, Seoul (KR); Jihee Han, Seoul (KR); Jongmo Kim, Goyang-si (KR); Jonghyuk Lim, Seoul (KR); Junsik An, Seoul (KR); Minsung Son, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 586 days.

(21) Appl. No.: 17/120,058

(22) Filed: Dec. 11, 2020

(65) Prior Publication Data

US 2022/0067400 A1    Mar. 3, 2022

(30) Foreign Application Priority Data

Aug. 25, 2020 (KR) .......................... 10-2020-0106850

(51) Int. Cl.
*G06V 20/58* (2022.01)
*B60W 30/06* (2006.01)
(Continued)

(52) U.S. Cl.
CPC ............. *G06V 20/58* (2022.01); *B60W 30/06* (2013.01); *B60W 30/0953* (2013.01);
(Continued)

(58) Field of Classification Search
CPC ...... G06V 20/58; G06V 10/44; G06V 20/588; G06V 10/22; G06V 20/586; B60W 30/06; B60W 30/0953; B60W 30/0956; B60W 60/0015; B60W 2420/42; B60W 2554/4029; B60W 2422/70; B60W 2554/4041; B60W 2554/80; B60W 40/02; B60W 40/10; B60W 2554/00; G06F 18/2148; G06T 7/62; G06T 2207/30264; G06T 2207/20081; B60Y 2300/06
See application file for complete search history.

(56) References Cited

U.S. PATENT DOCUMENTS 10,684,625 B2 * 6/2020 Miller .................... G08G 1/143
10,685,447 B2 * 6/2020 Sergeev .................... G06T 7/97
(Continued)

*Primary Examiner* — Frederick M Brushaber
(74) *Attorney, Agent, or Firm* — MORGAN, LEWIS & BOCKIUS LLP

(57) ABSTRACT

A vehicle may include a camera obtaining a surrounding image around the vehicle; and a controller configured to derive spatial recognition data by learning the surrounding image of the vehicle as an input value of the controller, derive object recognition data including wheel area data of surrounding vehicles around the vehicle by learning the surrounding image of the vehicle as an input value of the controller, determine a ground clearance between a bottom surface of a vehicle body of the surrounding vehicles and a ground by use of the spatial recognition data and the wheel area data, and control the vehicle to park the vehicle according to the ground clearance.

18 Claims, 14 Drawing Sheets

(51) Int. Cl.
*B60W 30/095* (2012.01)
*B60W 60/00* (2020.01)
*G06F 18/214* (2023.01)
*G06T 7/62* (2017.01)
*G06V 10/44* (2022.01)
*G06V 20/56* (2022.01)
*G06V 10/22* (2022.01)

(52) U.S. Cl.
CPC .... *B60W 30/0956* (2013.01); *B60W 60/0015* (2020.02); *G06F 18/2148* (2023.01); *G06T 7/62* (2017.01); *G06V 10/44* (2022.01); *G06V 20/588* (2022.01); *B60W 2420/403* (2013.01); *B60W 2554/4029* (2020.02); *G06T 2207/30264* (2013.01); *G06V 10/22* (2022.01)

(56) References Cited

U.S. PATENT DOCUMENTS

| | | | |
|---|---|---|---|
| 10,793,070 B2 * | 10/2020 | Watanabe | H04N 7/18 |
| 10,906,493 B2 * | 2/2021 | Church | H04N 7/183 |
| 2017/0270370 A1 * | 9/2017 | Utagawa | B60R 1/00 |
| 2018/0075749 A1 * | 3/2018 | Park | B60W 40/02 |
| 2022/0121048 A1 * | 4/2022 | Kunii | B60Q 1/04 |

* cited by examiner

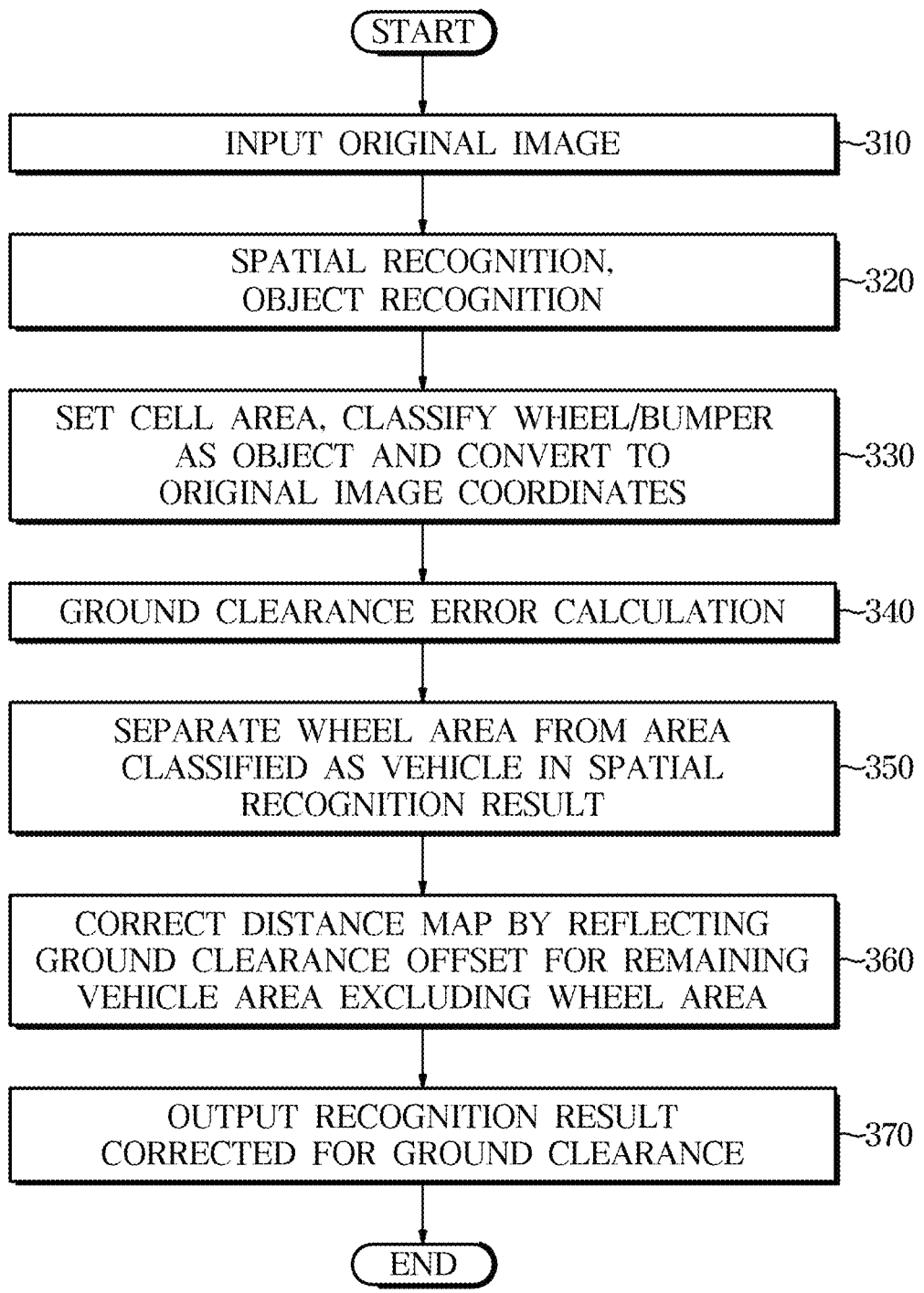

VEHICLE AND CONTROL METHOD THEREOF

CROSS-REFERENCE TO RELATED APPLICATION

The present application claims priority to Korean Patent Application No. 10-2020-0106850, filed on Aug. 25, 2020 in the Korean Intellectual Property Office, the entire contents of which is incorporated herein for all purposes by this reference.

BACKGROUND OF THE INVENTION

Field of the Invention

The present invention relates to a vehicle that performs autonomous parking and a control method thereof.

Description of Related Art

An autonomous driving technology of a vehicle is a technology in which the vehicle grasps a road condition and automatically drives even if a driver does not control a brake, a steering wheel, or an accelerator pedal.

The autonomous driving technology is a core technology for smart vehicle implementation. For autonomous driving, the autonomous driving technology may include highway driving assist (HDA, a technology that automatically maintains a distance between vehicles), blind spot detection (BSD, a technology that detects surrounding vehicles during reversing and sounds an alarm), autonomous emergency braking (AEB, a technology that activates a braking system when the vehicle does not recognize a preceding vehicle), lane departure warning system (LDWS), lane keeping assist system (LKAS, a technology that compensates for departing the lane without turn signals), advanced smart cruise control (ASCC, a technology that maintains a constant distance between vehicles at a set speed and drives at a constant speed driving), traffic jam assistant (TJA), parking collision-avoidance assist (PCA), and remote smart parking assist (RSPA).

In the technology for recognizing surrounding objects and parking spaces for autonomous parking control of vehicles, parking was performed using ultrasonic signals.

On the other hand, in recent years, research on an autonomous parking system that performs parking by additionally utilizing a camera has been actively conducted.

The spatial recognition result using the existing Semantic Segmentation labels the vehicle in its visible form, resulting in an error in the ground clearance. Therefore, when determining the actual distance to the vehicle, there is a problem that the distance to the vehicle is determined as a distance greater than the distance to the actual vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing determining the distance to the surrounding vehicle accurately by fusion of spatial recognition and object recognition to determine and correct the ground clearance of the vehicle.

In accordance with one aspect of the present invention, a vehicle includes: a camera obtaining a surrounding image around the vehicle; and a controller configured to derive spatial recognition data by learning the surrounding image of the vehicle as an input value of the controller, derive object recognition data including wheel area data of surrounding vehicles around the vehicle by learning the surrounding image of the vehicle as an input value of the controller, determine a ground clearance between a bottom surface of a vehicle body of the surrounding vehicles and a ground by use of the spatial recognition data and the wheel area data, and control the vehicle to park the vehicle according to the ground clearance.

The controller may be configured to reflect the ground clearance for the remaining area of the surrounding vehicle excluding a wheel area.

The controller may be configured to correct a distance between the vehicle and the surrounding vehicle by reflecting the determined ground clearance.

The object recognition data may include at least one of the surrounding vehicle, bumper area data of the surrounding vehicle, and pedestrian data around the vehicle.

The controller may be configured to derive object recognition data including first wheel area data and second wheel area data when the first wheel and second wheel of the same side of the surrounding vehicle are recognized, and determine the ground clearance between the surrounding vehicle and the ground by use of the first wheel area data and the second wheel area data.

The controller may be configured to confirm the center of the ground in contact with the first wheel and a midpoint of a line segment passing through a midpoint of the ground in contact with the second wheel by use of the first wheel area data and the second wheel area data, and determine the ground clearance by use of the length of the vertical line between the bottom surface of the vehicle body of the surrounding vehicle at the midpoint of the line segment.

The controller may be configured to derive object recognition data including the first wheel area data, the second wheel area data and the bumper area data when the first wheel and the second wheel on the same side of the surrounding vehicle and any one of the bumper of the front surface or the rear surface of the surrounding vehicle is recognized by the controller, and determine the ground clearance by use of the bumper area data, the first wheel area data and the second wheel area data.

The controller may be configured to confirm the center of the ground in contact with the first wheel and a straight line passing through the center of the ground in contact with the second wheel, and determine the ground clearance by use of a length of the vertical line between the straight line and the recognized bumper.

The controller may be configured to derive object recognition data including the first wheel area data when the first wheel of the surrounding vehicle is recognized by the controller, and determine the ground clearance by use of the recognized first wheel area data.

The controller may be configured to convert the upper midpoint of the first wheel and the lower midpoint of the first wheel into world coordinate values, respectively, and determine the ground clearance by determining a distance between the upper midpoint of the first wheel and the ground by use of the transformed world coordinate value and a height of the camera from the ground.

In accordance with another aspect of the present invention, a control method of a vehicle includes: deriving spatial recognition data by learning the surrounding image of the vehicle as an input value of the controller; deriving object recognition data including wheel area data of surrounding vehicles around the vehicle by learning the surrounding image of the vehicle as an input value of the controller; determining a ground clearance between a bottom surface of a vehicle body of the surrounding vehicles and a ground by use of the spatial recognition data and the wheel area data; and controlling the vehicle to park the vehicle according to the ground clearance.

The control method may further include: reflecting the ground clearance for the remaining area of the surrounding vehicle excluding a wheel area.

The control method may further include: correcting the distance between the vehicle and the surrounding vehicle by reflecting the determined ground clearance.

The object recognition data may include at least one of the surrounding vehicle, bumper area data of the surrounding vehicle, and pedestrian data around the vehicle.

The control method may further include: deriving object recognition data including first wheel area data and second wheel area data when the first wheel and second wheel of the same side of the surrounding vehicle are recognized; and determining the ground clearance between the surrounding vehicle and the ground by use of the first wheel area data and the second wheel area data.

The control method may further include: confirming the center of the ground in contact with the first wheel and a midpoint of a line segment passing through a midpoint of the ground in contact with the second wheel by use of the first wheel area data and the second wheel area data; and determining the ground clearance by use of the length of the vertical line between the bottom surface of the vehicle body of the surrounding vehicle at the midpoint of the line segment.

The control method may further include: deriving object recognition data including the first wheel area data, the second wheel area data and the bumper area data when the first wheel and the second wheel on the same side of the surrounding vehicle and any one of the bumper of the front surface or the rear surface of the surrounding vehicle is recognized; and determining the ground clearance by use of the bumper area data, the first wheel area data and the second wheel area data.

The control method may further include: confirming the center of the ground in contact with the first wheel and a straight line passing through the center of the ground in contact with the second wheel; and determining the ground clearance by use of a length of the vertical line between the straight line and the recognized bumper.

The control method may further include: deriving object recognition data including the first wheel area data when the first wheel of the surrounding vehicle is recognized; and determine the ground clearance by use of the recognized first wheel area data.

The control method may further include: converting the upper midpoint of the first wheel and the lower midpoint of the first wheel into world coordinate values, respectively; and determining the ground clearance by determining a distance between the upper midpoint of the first wheel and the ground by use of the transformed world coordinate value and a height of the camera from the ground.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 is a flowchart of a control method of a vehicle according to various exemplary embodiments of the present invention.

Figure 1A:
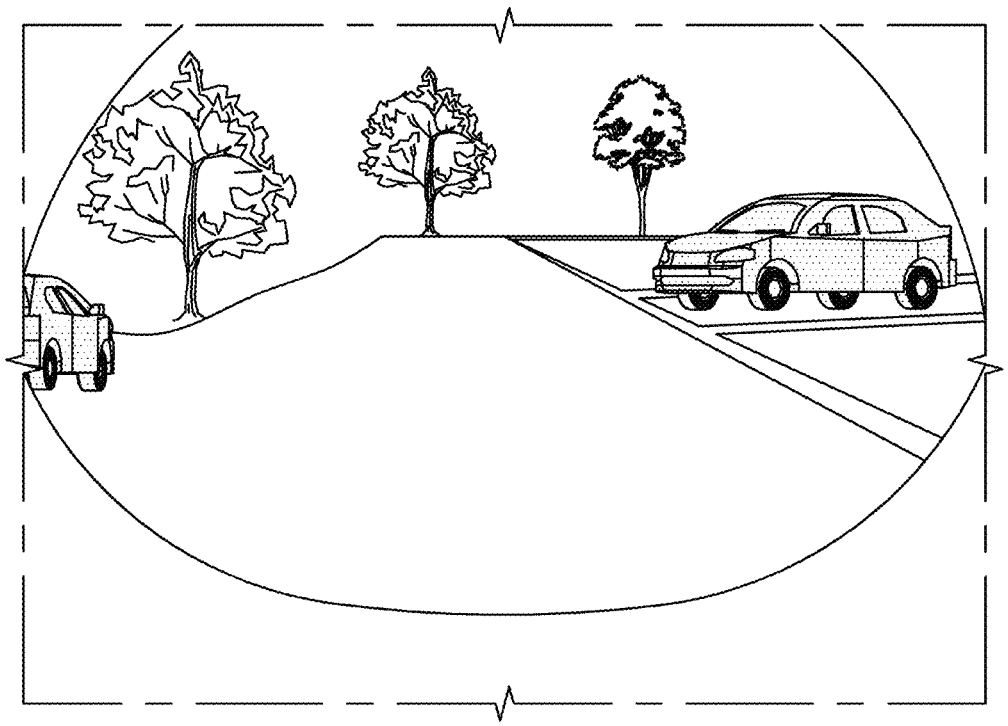
FIG. 1A, FIG. 1B and FIG. 1C are diagrams according to the related art of present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~ part", "~ module", "~ member", "~ block", etc., may be implemented in software or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in the present specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

Figure 1B:
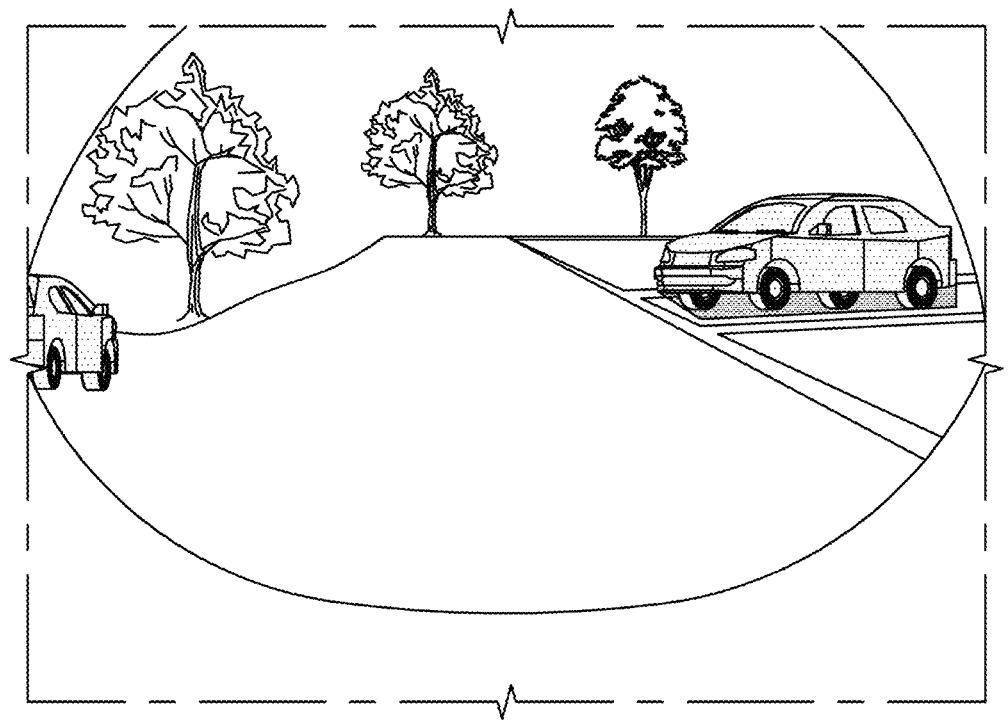
Figure 1C:
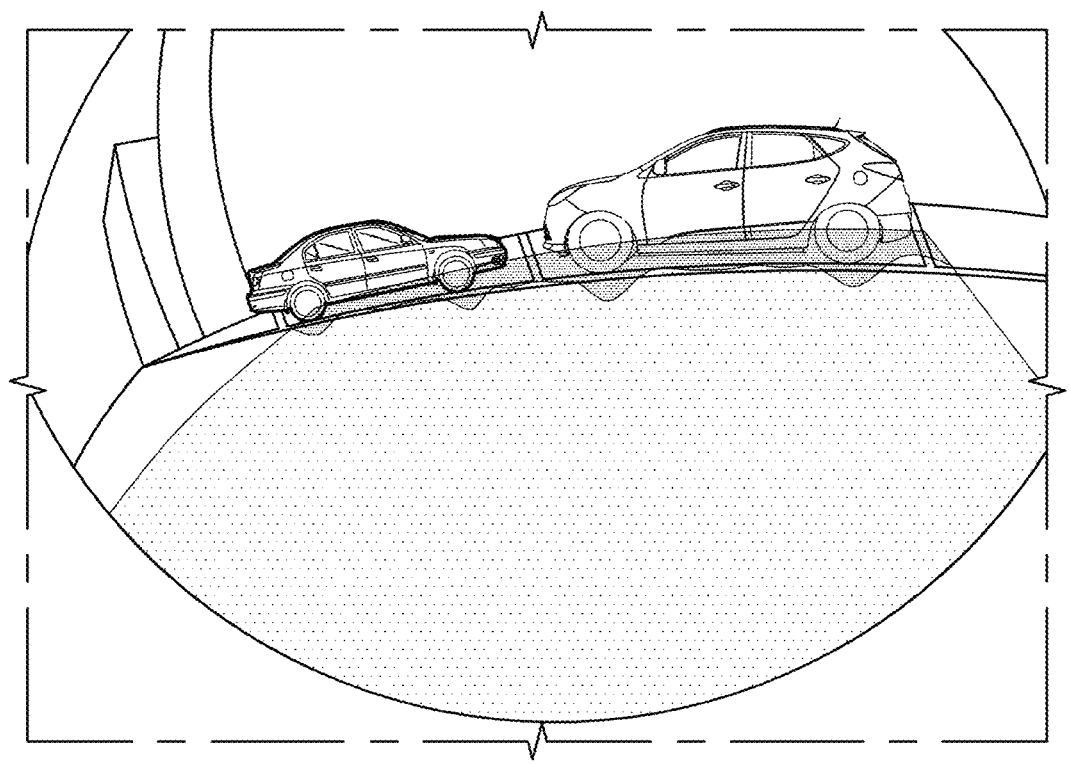

FIGS. 1A to 1C are diagrams according to the related art of present invention.

Referring to FIG. 1A, an image in which a surrounding vehicle is labeled as it is by performing spatial recognition using Semantic Segmentation through a Surround View Monitor (SVM) camera in a vehicle is shown.

Referring to FIG. 1B, an image including an area actually occupied by the surrounding vehicle is shown. In more detail, it may be seen that the space between the body bottom surface of the surrounding vehicle and the ground is also an area occupied by the vehicle.

However, as shown in FIG. 1A, when spatial recognition using Semantic Segmentation is performed, all areas actually occupied by the surrounding vehicle are not displayed. Therefore, there is a problem that the distance between the vehicle and the surrounding vehicle is determined to be farther than the actual distance between the vehicle and the surrounding vehicle.

Referring to FIG. 1C, by performing spatial recognition using Semantic Segmentation through a Surround View Monitor (SVM) camera in the vehicle, for the entire surrounding vehicle, an image of labeling the surrounding vehicle after correcting an error according to the distance between the body bottom surface of the surrounding vehicle and the ground is shown. In more detail, when the ground clearance is corrected and displayed for the entire surrounding vehicle, there is a problem in that the distance between the vehicle and the surrounding vehicle is determined closer than the actual distance between the vehicle and the surrounding vehicle due to the wheel area of the surrounding vehicle in contact with the ground.

Figure 2:
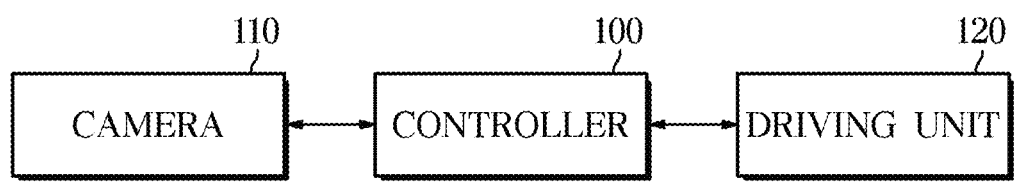
FIG. 2 is a control block diagram of a vehicle according to various exemplary embodiments of the present invention.

FIG. 2 is a control block diagram of a vehicle according to various exemplary embodiments of the present invention.

Referring to FIG. 2, the vehicle 1 may include a camera 110 obtaining a surrounding image of the vehicle, a controller 100 deriving spatial recognition data by learning the surrounding image of the vehicle as an input value of the controller, deriving object recognition data including wheel area data of surrounding vehicles around the vehicle by learning the surrounding image of the vehicle as an input value of the controller, determining a ground clearance between a bottom surface of a vehicle body of the surrounding vehicles and a ground by use of the spatial recognition data and the wheel area data and controlling the vehicle to park the vehicle by reflecting the ground clearance and driving unit 120.

The camera 110 may have a plurality of channels, and may obtain a surrounding image of the vehicle.

The camera 110 may be provided in the vehicle 1 to perform an operation of a Surround View Monitor (SVM).

The camera 110 may include a CCD (Charge-Coupled Device) camera or a CMOS color image sensor. Here, both the CCD and CMOS may refer to a sensor that converts and stores light input through the lens of the camera 110 into electrical signals.

The camera 110 may obtain a surrounding image of the vehicle 1 including a parking line for parking the vehicle 1.

The driving unit 120 may be provided as a device configured for driving the vehicle 1.

The driving unit 120 may include an engine, and may include various components configured for driving the engine. In more detail, the driving unit 120 may include a brake and a steering device, and the device configuration is not particularly limited as long as it is a configuration that implements driving of the vehicle 1.

The controller 100 may derive spatial recognition data by learning the surrounding image of the vehicle obtained from the camera 110 as an input value. For example, the controller 100 may recognize a surrounding space of the vehicle 1, a surrounding vehicle, and an obstacle by receiving a 4-channel image of the SVM system of the camera 110 and performing a pre-learned algorithm.

The controller 100 may derive object recognition data by learning the surrounding image of the vehicle acquired from the camera 110 as an input value. For example, the controller 100 receives a 4-channel image of the SVM system of the camera 110 and performs a pre-learned algorithm, and may recognize a surrounding vehicle of the vehicle 1, a wheel, a bumper of the surrounding vehicle, and a pedestrian around the vehicle 1 as objects, respectively.

Here, the controller 100 may derive the wheel area of the surrounding vehicle from the surrounding image as object recognition data. Furthermore, the controller 100 may derive at least one of the surrounding vehicle, the bumper area of the surrounding vehicle, and the surrounding pedestrian from the surrounding image as object recognition data.

The controller 100 may form a distance map by mapping the object recognition data to the spatial recognition data.

The controller 100 may determine a ground clearance between the bottom surface of the surrounding vehicle and the ground by use of the wheel area data and the bumper area data among the object recognition data.

In more detail, the controller 100 may recognize the first wheel and the second wheel on the same side of the surrounding vehicle through the camera 110. The controller 100 may derive object recognition data including first wheel area data and second wheel area data of the surrounding vehicle.

In the instant case, the controller 100 may confirm the midpoint of the ground contacting with the first wheel by use of the first wheel area data and the second wheel area data. The center of the ground in contact with the first wheel and the midpoint of the line segment passing through the center of the ground in contact with the second wheel may be confirmed. The ground clearance may be determined by use of the length of the vertical line between the bottom surface of the vehicle body of the surrounding vehicle at the midpoint of the line segment.

In more detail, the controller 100 may recognize the first wheel and the second wheel on the same side of the surrounding vehicle through the camera 110. Furthermore, the controller 100 may recognize a bumper of either a front surface or a rear surface of the surrounding vehicle through the camera 110. The controller 100 may derive object recognition data including the first wheel area data, the second wheel area data, and the bumper area data.

In the instant case, the controller 100 may confirm the midpoint of the ground contacting with the first wheel by use of the first wheel area data and the second wheel area data. The center of the ground in contact with the first wheel and the midpoint of the line segment passing through the center of the ground in contact with the second wheel may be confirmed. The ground clearance may be determined by use of the length of the vertical line between the bottom surface of the vehicle body of the surrounding vehicle at the midpoint of the line segment.

In addition, the controller 100 may confirm the center of the ground in contact with the first wheel and a straight line passing through the center of the ground in contact with the second wheel and the controller 100 may determine the ground clearance by use of a length of the vertical line between the straight line and the recognized bumper.

In more detail, the controller 100 may recognize the first wheel on the same side of the surrounding vehicle through the camera 110. The controller 100 may derive object recognition data including the first wheel area data.

In the instant case, the controller 100 may convert a midpoint at the top portion of the first wheel and a midpoint at the bottom portion of the first wheel into world coordinate values, respectively, using the first wheel area data. Here, the controller 100 may determine a distance between the midpoint of the top portion of the first wheel and the ground by use of the converted world coordinate value and the height of the camera 110 from the ground. Furthermore, the controller 100 may determine the ground clearance by use of the distance between the midpoint of the top portion of the first wheel and the ground.

The controller 100 may convert the wheel area into a background area and map the object recognition data to the spatial recognition data.

The controller 100 may reflect the ground clearance with respect to the remaining area of the surrounding vehicle excluding a wheel area.

The controller 100 may correct the distance between the vehicle 1 and the surrounding vehicle by reflecting the determined ground clearance.

The controller 100 may apply the corrected distance to a PCA system that assists in preventing collision when parking the vehicle 1 and a RSPA system that searches parking spaces and automatically parks through the control of the vehicle 1.

The controller 100 may control the driving unit 120 to park the vehicle 1 according to the control of the PCA system and the RSPA system.

Figure 3A:
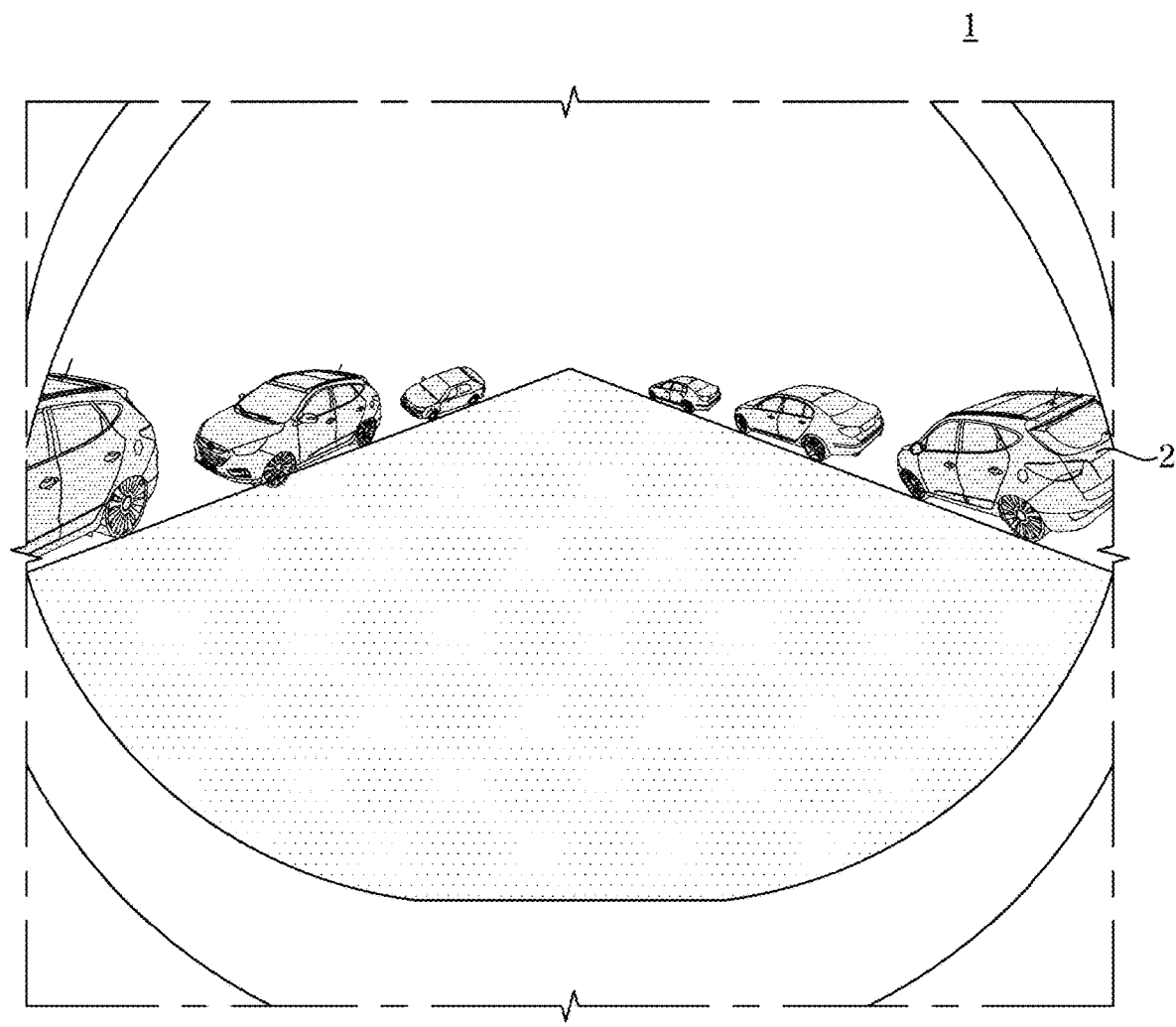
FIG. 3A, FIG. 3B and FIG. 3C are diagrams illustrating images of spatial recognition and object recognition of a vehicle according to various exemplary embodiments of the present invention.
Figure 3B:
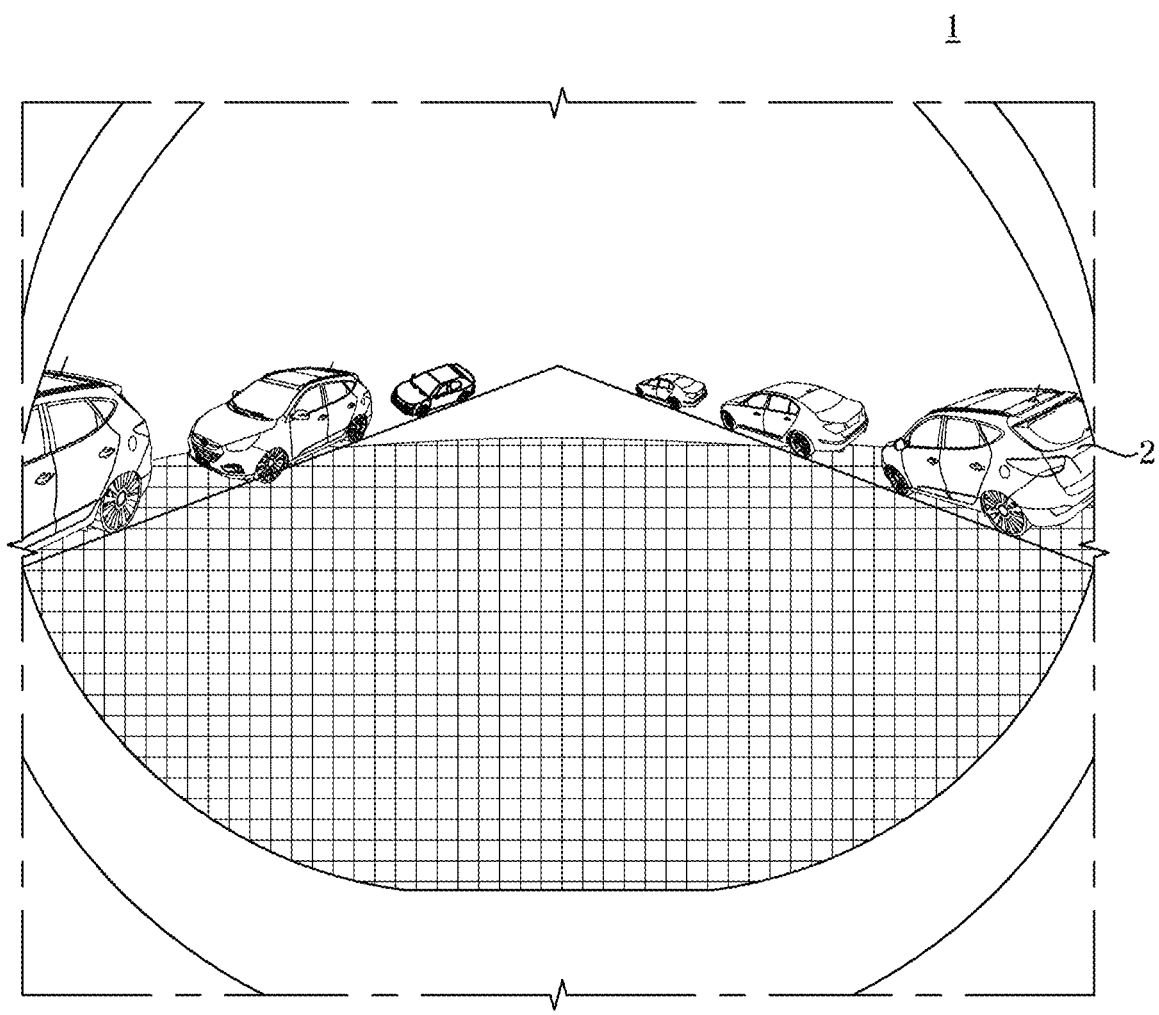
Figure 3C:
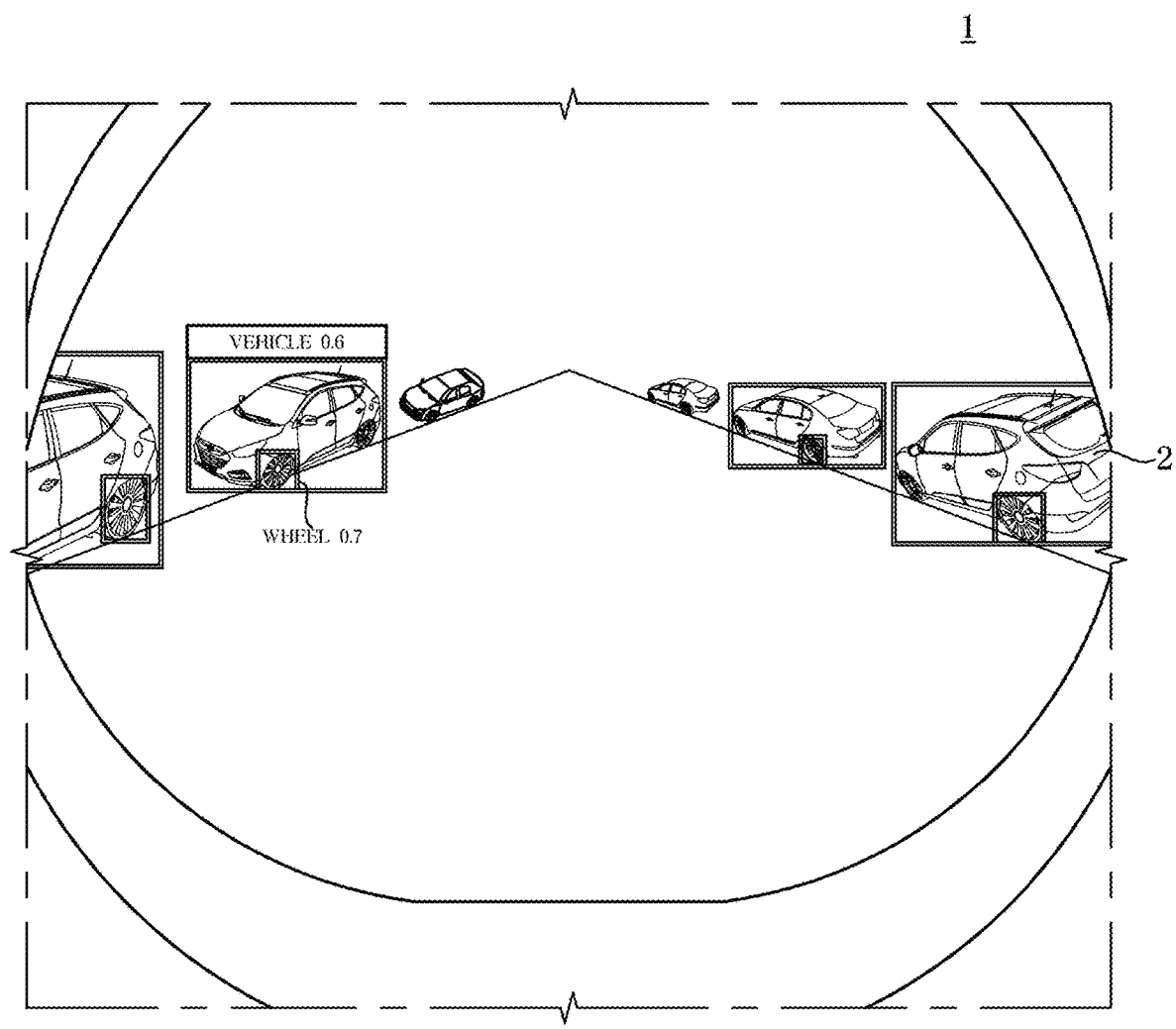

FIG. 3A, FIG. 3B and FIG. 3C are diagrams illustrating images of spatial recognition and object recognition of a vehicle according to various exemplary embodiments of the present invention.

Referring to FIG. 3A, by performing spatial recognition through the camera 110 of the vehicle 1, an image of labeling the surrounding vehicle as it is shown.

Referring to FIG. 3B, the vehicle 1 may divide a cell area based on the coordinates of the camera 110 on an image subjected to spatial recognition. For example, the vehicle 1 may divide a cell every 6° from the front or the rear to divide a total of 30 cells, and divide the cell every 3° from the side to divide a total of 60 cells, but is not limited thereto.

Referring to FIG. 3C, the vehicle 1 performs object recognition and shows an image of classifying the surrounding vehicle 2 as an object. For example, the vehicle 1 may classify each of the surrounding vehicle (vehicle 0.6) and the wheel (wheel 0.7) of the surrounding vehicle (vehicle 0.6) as objects.

The vehicle 1 may convert a coordinate value for the surrounding vehicle (vehicle 0.6) and the wheel (wheel 0.7) of the surrounding vehicle (vehicle 0.6) of the image that has performed object recognition into a coordinate value for the original image. In more detail, since the object recognition is performed by converting the original image into a distortion-corrected image, to convert back to the original image after performing the above object recognition, the vehicle 1 may re-convert the coordinate values of the image subjected to object recognition to the coordinate values for the original image by applying it to the four points that make up the bounding box.

As described above, re-converting the image that has undergone object recognition back to the coordinate value of the original image may be for re-converting the image that has undergone object recognition into coordinate values for the original image and mapping it to the original image that has undergone spatial recognition.

Figure 4:
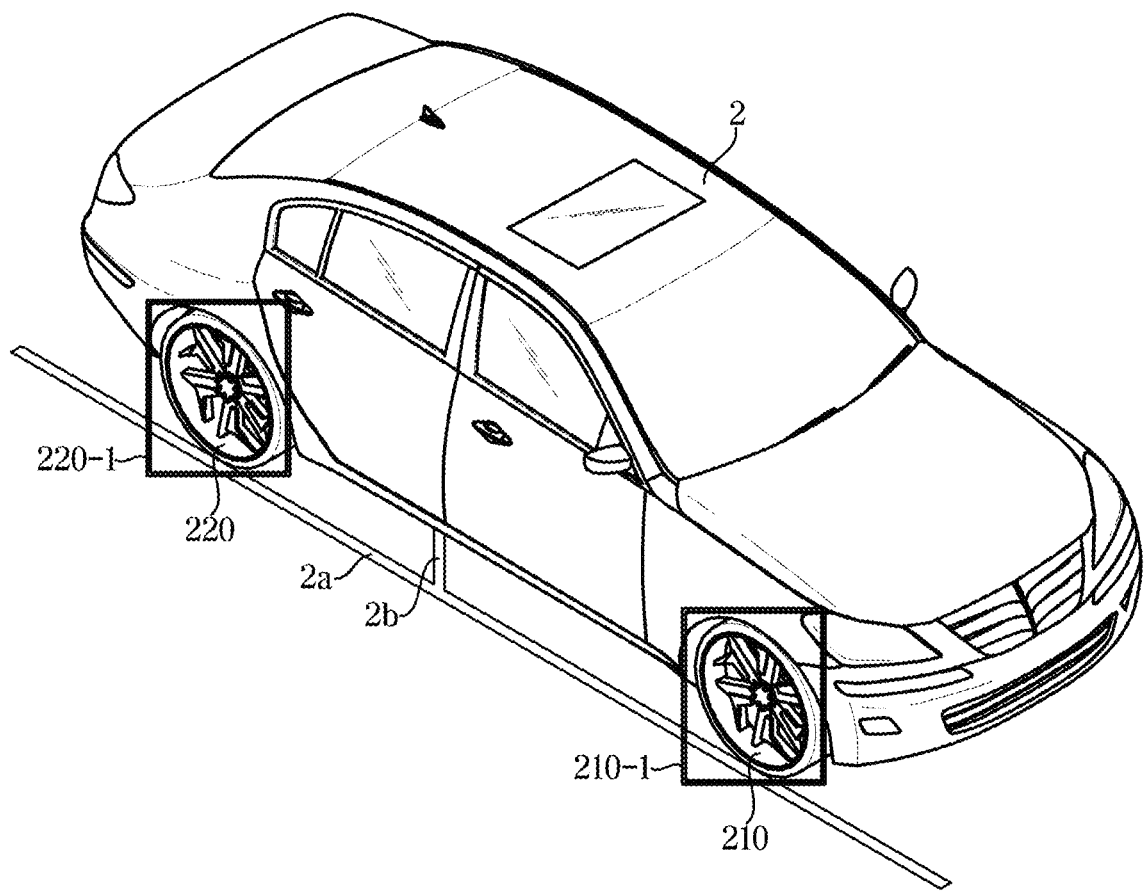
FIG. 4 is a perspective view exemplarily illustrating a method of determining a ground clearance of a vehicle according to various exemplary embodiments of the present invention.

FIG. 4 is a perspective view exemplarily illustrating a method of determining a ground clearance of a vehicle according to various exemplary embodiments of the present invention.

Referring to FIG. 4, when the first wheel 210 and the second wheel 220 on the same side of the surrounding vehicle 2 are recognized through the camera 110 of the vehicle 1, a method of determining the ground clearance is shown.

The vehicle 1 may derive an object recognition data including a data of a first wheel area 210-1 corresponding to the first wheel 210 of the surrounding vehicle 2 and a data of a second wheel area 220-1 corresponding to the second wheel 220.

The vehicle 1 may confirm the midpoint of the ground contacting with the first wheel 210 by use of the data of the first wheel area 210-1 and the data of the second wheel area 220-1. A line segment 2a passing through the center of the ground in contact with the first wheel 210 and the center of the ground in contact with the second wheel 220 may be confirmed.

The vehicle 1 may confirm the midpoint of the line segment 2a. The vehicle 1 may confirm a vertical line 2b between the bottom surface of the vehicle body of the surrounding vehicle 2 at the midpoint of the line segment 2a. The vehicle 1 may determine the ground clearance between the bottom surface of the vehicle body of the surrounding vehicle 2 and the ground using the length of the vertical line 2b.

Figure 5:
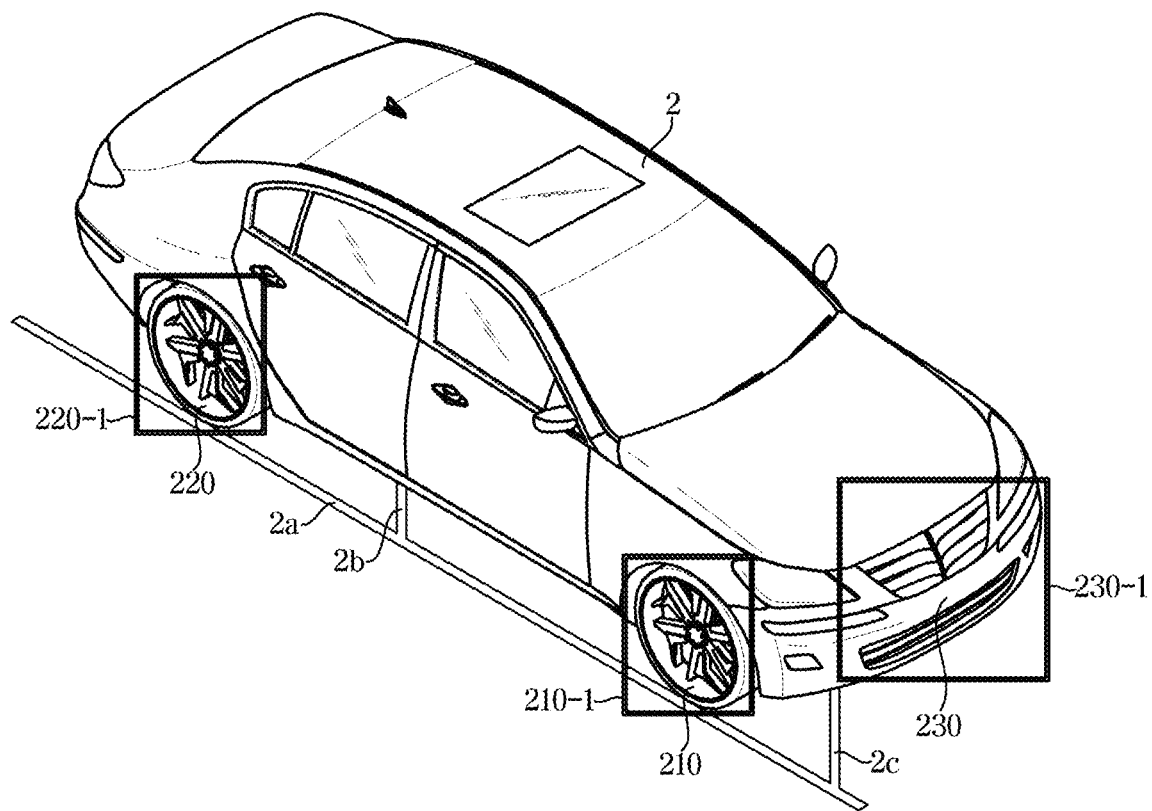
FIG. 5 is a perspective view exemplarily illustrating a method of determining a ground clearance of a vehicle according to various exemplary embodiments of the present invention.

FIG. 5 is a perspective view exemplarily illustrating a method of determining a ground clearance of a vehicle according to various exemplary embodiments of the present invention.

Referring to FIG. 5, the vehicle 1 recognizes the first wheel 210 and the second wheel 220 on the same side of the surrounding vehicle through the camera 110, and in the case of recognizing a bumper 230 of either a front surface or a rear surface of the surrounding vehicle, a method of determining the ground clearance is shown.

The vehicle 1 may derive an object recognition data including data of a first wheel area 210-1 corresponding to the first wheel 210 of the surrounding vehicle 2 and data of a second wheel area 220-1 corresponding to the second wheel 220.

The vehicle 1 may confirm the midpoint of the ground contacting with the first wheel 210 by use of the data of the first wheel area 210-1 and the data of the second wheel area 220-1. A line segment 2a passing through the center of the ground in contact with the first wheel 210 and the center of the ground in contact with the second wheel 220 may be confirmed. The vehicle 1 may confirm the midpoint of the line segment 2a. The vehicle 1 may confirm a vertical line 2b between the bottom surface of the vehicle body of the surrounding vehicle 2 at the midpoint of the line segment 2a.

The vehicle 1 may confirm a line segment passing through the center of the ground contacting with the first wheel 210 and the center of the ground contacting with the second wheel 220. By extending the line segment 2a in the direction of the bumper 230, a vertical line 2c between the extending line segment 2a and the bumper 230 may be confirmed.

The vehicle 1 may determine the ground clearance between the bottom surface of the vehicle body of the surrounding vehicle 2 and the ground between the first wheel 210 and the second wheel 220 and the ground clearance between the vehicle body bottom surface of the surrounding vehicle and the ground between the wheels 210 and 220 and the bumper 230, respectively.

Figure 6A:
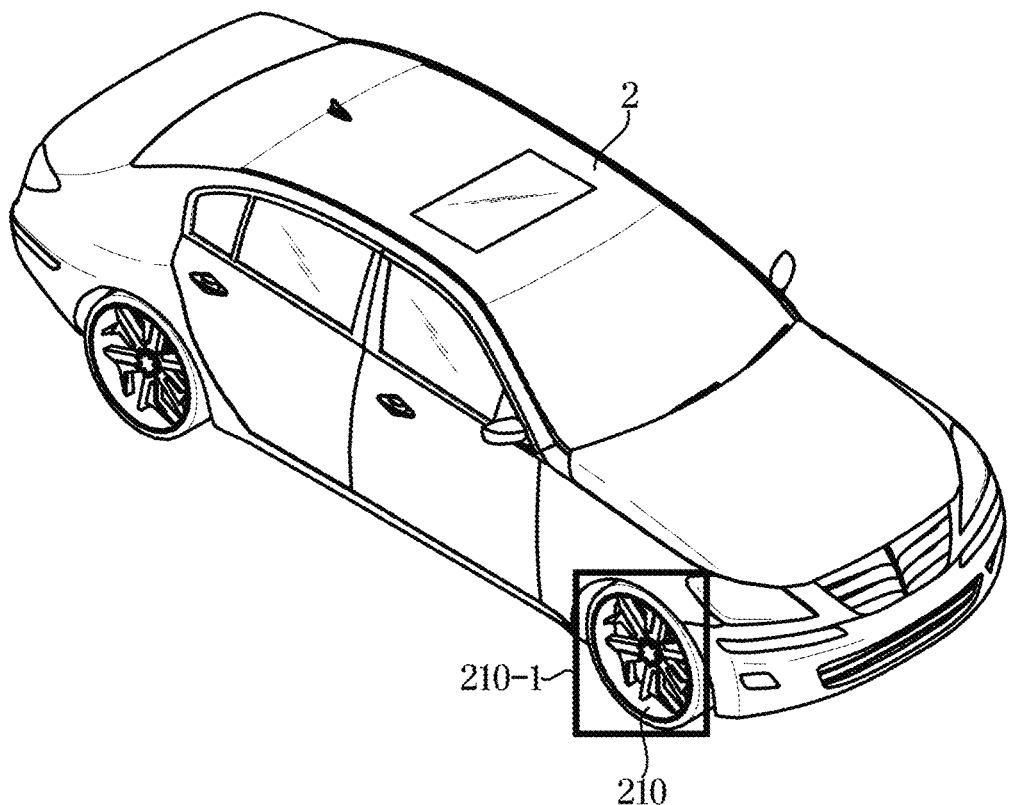
FIG. 6A and FIG. 6B are perspective views illustrating a method of determining a ground clearance of a vehicle according to various exemplary embodiments of the present invention.
Figure 6B:
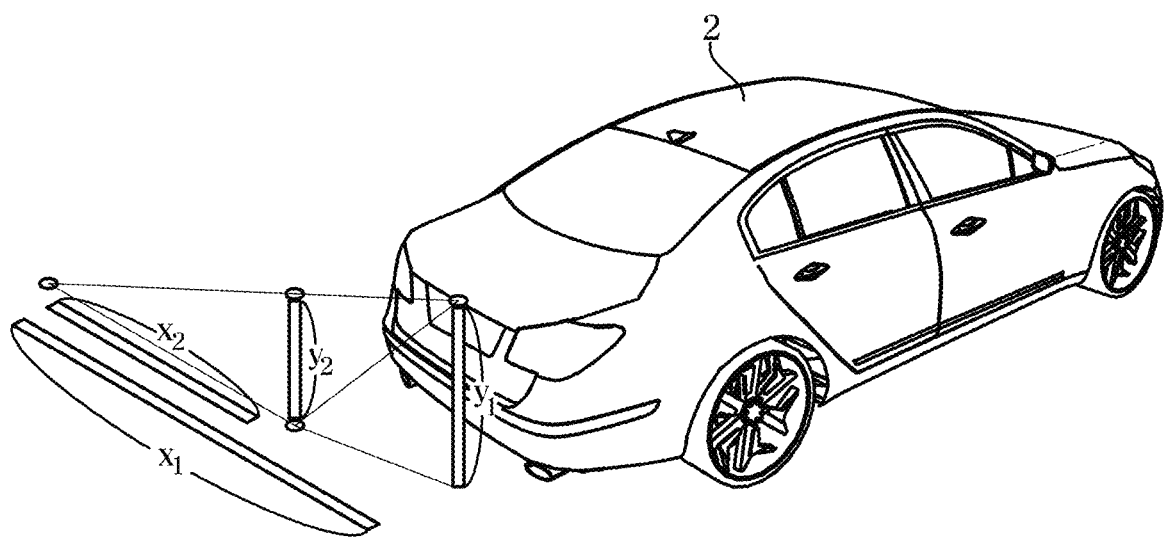

FIG. 6A and FIG. 6B are perspective views illustrating a method of determining a ground clearance of a vehicle according to various exemplary embodiments of the present invention.

Referring to FIG. 6A, the vehicle 1 shows a method of determining the ground clearance when recognizing only the first wheel 210 of the same side of the surrounding vehicle 2 through the camera 110.

The vehicle 1 may derive an object recognition data including data of a first wheel area 210-1 corresponding to the first wheel 210 of the surrounding vehicle 2.

The vehicle 1 may convert a midpoint at the top portion of the first wheel 210 and a midpoint at the bottom portion of the first wheel 210 into world coordinate values by use of the data of a first wheel area 210-1. In more detail, with reference to FIG. 6B, the vehicle 1 may determine the distance Y2 between the midpoint of the top portion of the first wheel 210 and the ground by use of the converted world coordinate value and the distance between the camera 110 and the ground. For example, by use of the X1:Y1=X2:Y2 proportional equation, the distance Y2 between the midpoint at the top portion of the first wheel 210 and the ground may be determined.

The vehicle 1 may determine the ground clearance between the bottom surface of the vehicle body of the surrounding vehicle 2 and the ground by use of the distance between the ground and the midpoint at the top portion of the first wheel 210.

Figure 7A:
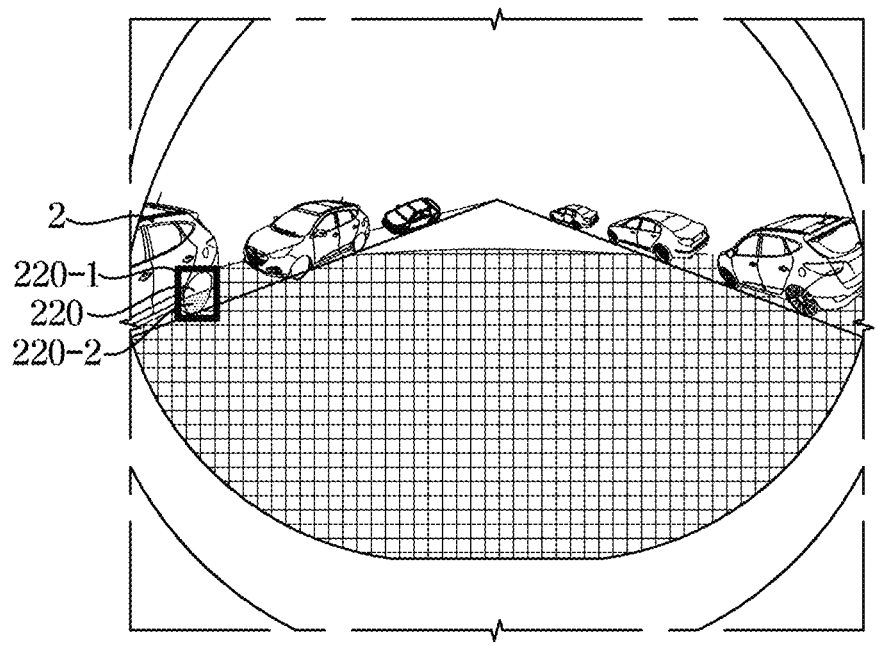
FIG. 7A, FIG. 7B, and FIG. 7C are diagrams illustrating a method of determining a ground clearance of a vehicle according to various exemplary embodiments of the present invention.
Figure 7B:
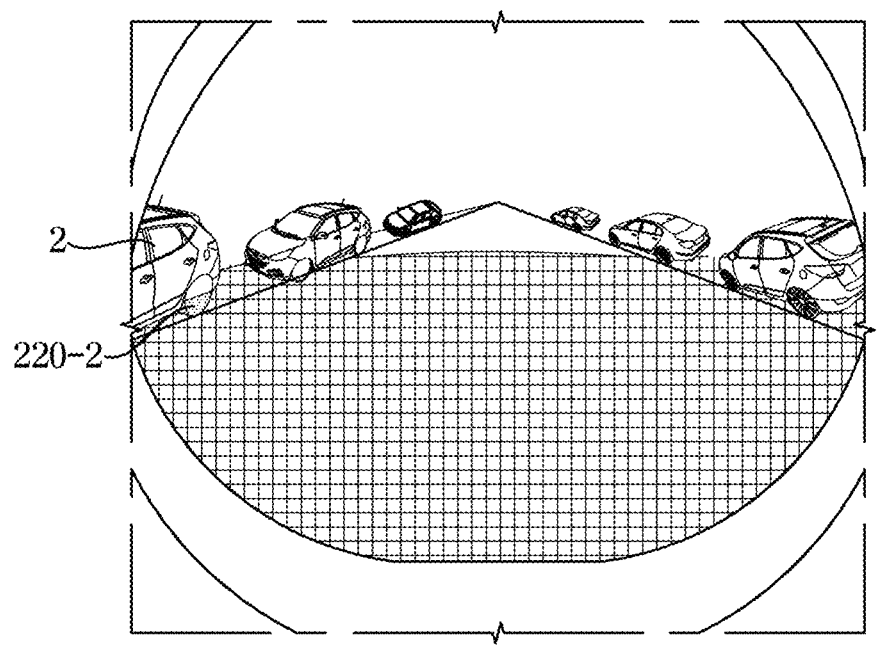
Figure 7C:
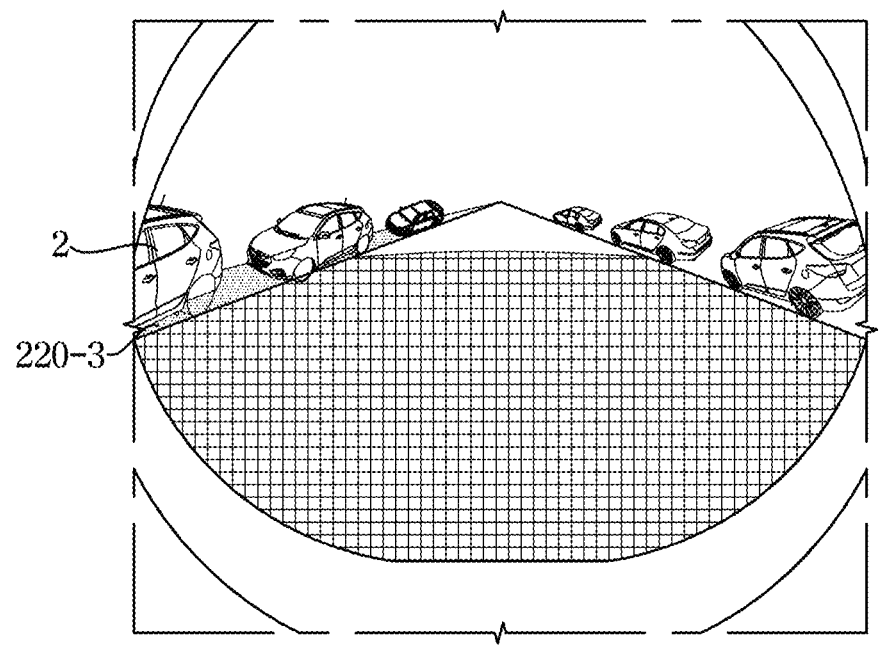

FIG. 7A, FIG. 7B, and FIG. 7C are diagrams illustrating a method of determining a ground clearance of a vehicle according to various exemplary embodiments of the present invention.

Referring to FIG. 7A, FIG. 7B, and FIG. 7C, it shows a method of determining the ground clearance between the bottom surface of the vehicle body of the surrounding vehicle and the ground by use of the wheel area data of the surrounding vehicle among spatial recognition data and the object recognition data.

Referring to FIG. 7A, FIG. 7B, and FIG. 7C, the vehicle 1 extracts the nearest point from the vehicle 1 for each cell and determines the ground clearance when the extracted point is the surrounding vehicle 2. In more detail, when a cell close to the vehicle 1 is an empty space or corresponds to a parking line, the vehicle 1 may confirm the next cell in a direction away from the vehicle 1. As described above, it is possible to confirm whether the cell corresponds to a surrounding vehicle by confirming the cell in a direction away from the vehicle 1 from a region close to the vehicle 1.

Referring to FIG. 7A, FIG. 7B, and FIG. 7C, when the confirmed cell corresponds to the surrounding vehicle 2, the vehicle 1 may determine the ground clearance between the bottom surface of the vehicle body of the surrounding vehicle and the ground by use of the data of a second wheel area 220-1 corresponding to the second wheel 220 of the surrounding vehicle.

The vehicle 1 may reflect (220-3) a ground clearance between the bottom surface of the vehicle body of the surrounding vehicle and the ground with respect to a remaining area other than the second wheel area 220-2.

Figure 8A:
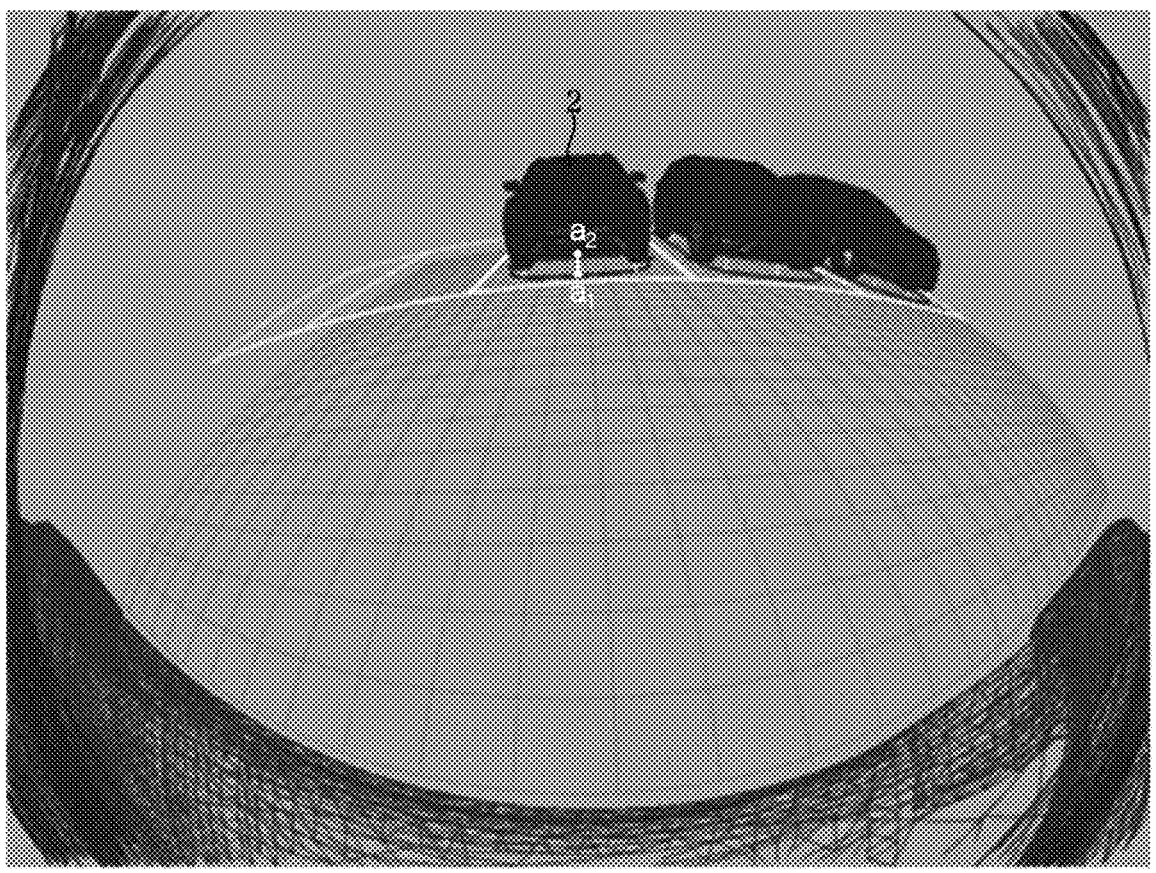
FIG. 8A and FIG. 8B are images illustrating a ground clearance of a vehicle according to various exemplary embodiments of the present invention.
Figure 8B:
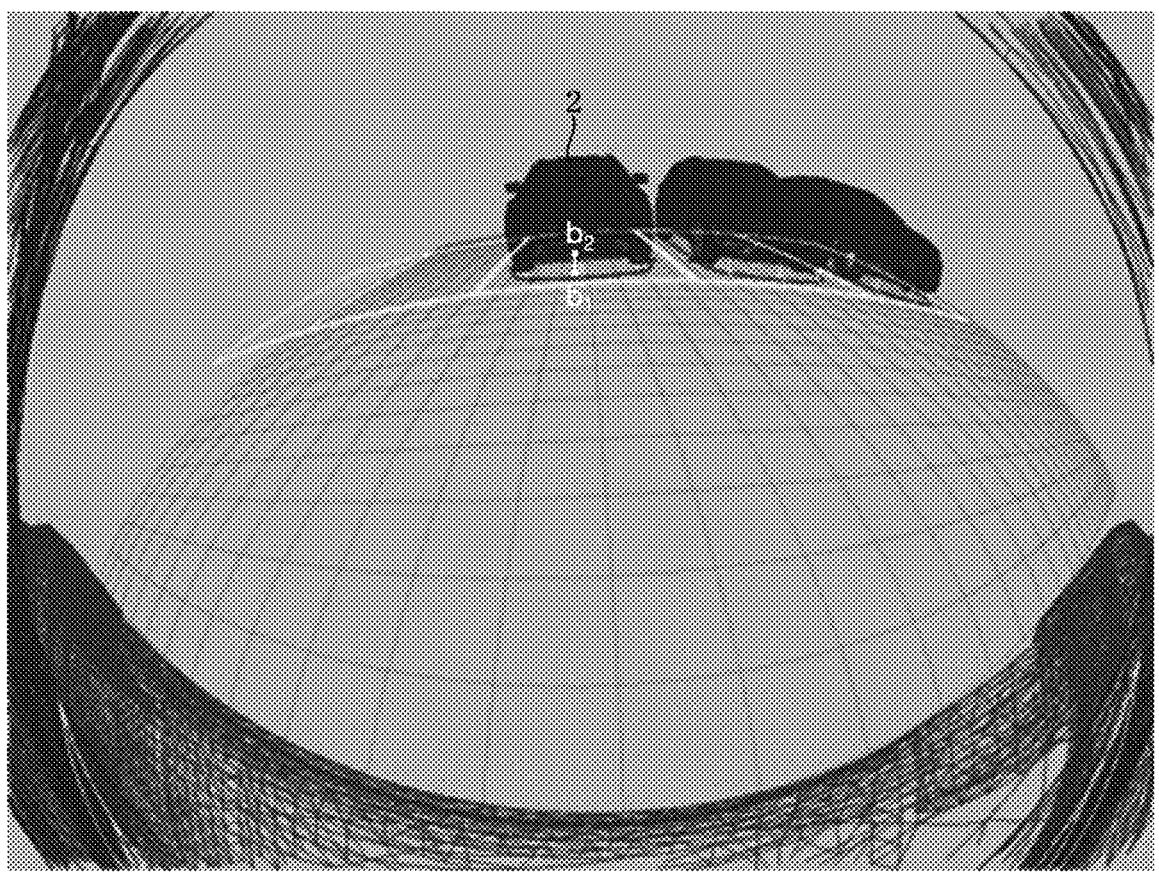

FIG. 8A and FIG. 8B are images illustrating a ground clearance of a vehicle according to various exemplary embodiments of the present invention.

FIG. 8A is an image in which the vehicle is parked based on Z=0. FIG. 8B is an image in which the vehicle is parked based on Z=300 mm. Each cell of FIG. 8A and FIG. 8B may be 25 cm in length and width.

As illustrated in FIG. 8A, a1 may represent a point in which a2 is projected to a ground. At the instant time, in the ground based on Z=0, the point where the surrounding vehicle 2 is actually located is a1, but the distance may be determined as the surrounding vehicle 2 is located at a2 by the ground clearance.

By the ground clearance, the vehicle 1 may determine the distance between the vehicle 1 and the surrounding vehicle 2 as a distance greater than the actual distance between the vehicle 1 and the surrounding vehicle 2 by about 70 cm-100 cm.

As shown in FIG. 8B, as the surrounding vehicle 2 is located at b2, the vehicle 1 may determine a distance between the vehicle 1 and b2 at which the surrounding vehicle 2 is located. In the instant case, a distance between the vehicle 1 and b2 where the surrounding vehicle 2 is located may be similar to an actual distance between the vehicle 1 and a1 where the surrounding vehicle 2 is located.

As described above, by reflecting the ground clearance between the bottom surface of the vehicle body of the surrounding vehicle and the ground, it may be corrected to be similar to the actual distance between the vehicle 1 and the surrounding vehicle.

Figure 9:
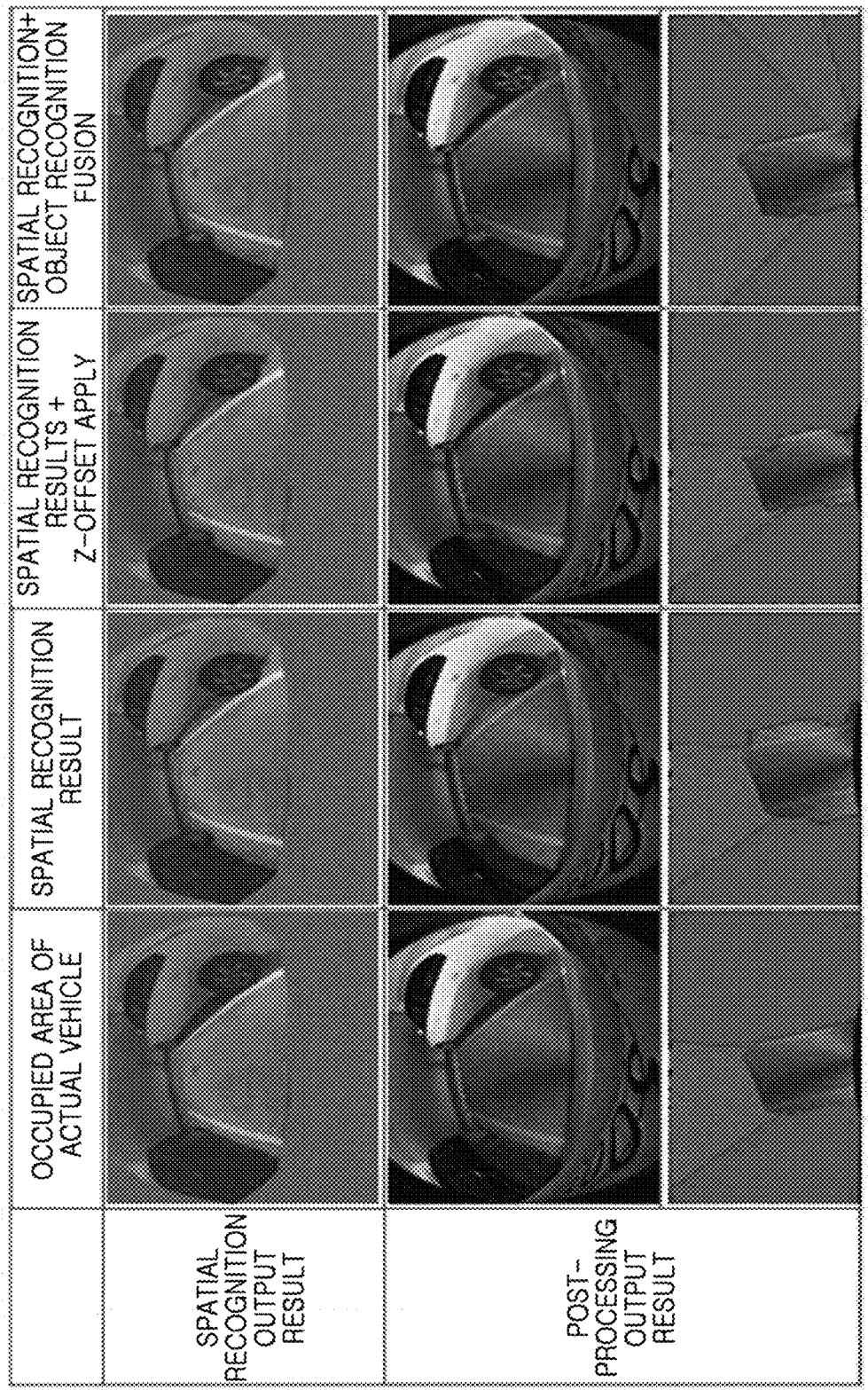
FIG. 9 is an image reflecting the ground clearance of a vehicle according to various exemplary embodiments of the present invention.

FIG. 9 is an image reflecting the ground clearance of a vehicle according to various exemplary embodiments of the present invention.

① of FIG. 9 is an image showing an occupied area of an actual surrounding vehicle.

② of FIG. 9 is an image showing the occupied area of the surrounding vehicle after performing spatial recognition. In more detail, referring to the post-processing output result of ②, since the area between the bottom surface of the vehicle body of the surrounding vehicle and the ground is displayed as an empty space, there is a problem that the distance between the vehicle 1 and the surrounding vehicle is determined to be farther than the actual distance.

③ of FIG. 9 is an image showing the occupied area of the surrounding vehicle in which ground clearance is corrected for the entire surrounding vehicle after performing spatial recognition. In more detail, referring to the post-processing output result of ③, since it is displayed that more areas are occupied than the actual occupied area of the surrounding vehicle, there is a problem in that the distance between the vehicle 1 and the surrounding vehicle is determined closer than it is.

④ of FIG. 9 is an image showing the occupied area of the surrounding vehicle in which ground clearance is corrected for the remaining area of the surrounding vehicle excluding the wheel by determining the ground clearance between the bottom surface of the vehicle body of the surrounding vehicle and the ground by performing object recognition after performing spatial recognition. In more detail, referring to the post-processing output result of ④, since it is displayed similarly to the actual occupied area of the surrounding vehicle, the distance between the vehicle 1 and the surrounding vehicle may be determined similarly to the actual.

FIG. 10 is a flowchart of a control method of a vehicle according to various exemplary embodiments of the present invention.

The vehicle 1 may receive an original image around the vehicle 1 through the camera 110 (310).

The vehicle 1 may perform spatial recognition and object recognition using the original image (320).

In the instant case, the original image may be the surrounding image of the vehicle 1.

In more detail, the vehicle 1 may derive spatial recognition data by learning the surrounding image of the vehicle as an input value.

For example, the vehicle 1 may recognize a surrounding space of the vehicle 1, a surrounding vehicle, and an obstacle by receiving a 4-channel image of the SVM system of the camera 110 and performing a pre-learned algorithm. The vehicle 1 may derive object recognition data by learning the surrounding image of the vehicle acquired from the camera 110 as an input value.

For example, the vehicle 1 receives a 4-channel image of the SVM system of the camera 110 and performs a pre-learned algorithm, and may recognize a surrounding vehicle of the vehicle 1, a wheel, a bumper of the surrounding vehicle, and a pedestrian around the vehicle 1 as objects, respectively. In the instant case, the vehicle 1 may derive at least one of the surrounding vehicle, the wheel area of the surrounding vehicle, the bumper area of the surrounding vehicle, and the surrounding pedestrian from the surrounding image as object recognition data.

The vehicle 1 may set a cell area in the spatial recognition data, convert an original image into a distortion correction image, and classify the wheel area and the bumper area among the object recognition data as object.

In the instant case, the vehicle 1 may classify the wheel area and the bumper area as an object and convert it back to original image coordinates (330).

The vehicle 1 may determine a ground clearance between a bottom surface of a vehicle body of the surrounding vehicles and a ground using at least one of the wheel area data and the bumper area data among the object recognition data (340).

The vehicle 1 may separate the wheel area from the vehicle 1 area in the spatial recognition data (350). In more detail, the vehicle 1 may convert the wheel area into a background area.

The vehicle 1 may correct the distance between the vehicle 1 and the surrounding vehicle by reflecting the ground clearance between the bottom surface of a vehicle body of the surrounding vehicle and the ground for the remaining area excluding the wheel area (360).

The ground clearance correction result may be output (370).

In various exemplary embodiments of the present invention, the type of the surrounding vehicle is not classified, but the types of the surrounding vehicle, for example, SUV and SEDAN, may be classified to apply different ground clearances.

According to various exemplary embodiments of the present invention, when the vehicle is parked, the distance to the surrounding vehicle may be accurately determined.

Furthermore, by accurately determining the distance to the surrounding vehicle, it is possible to optimize the parking path during parking and prevent collisions with the surrounding vehicle.

When a ground clearance correction is made for a vehicle class without excluding the vehicle's wheel area, it is possible to erroneously judge that the vehicle is closer than the actual distance. However, in the vehicle according to various exemplary embodiments of the present invention, by correcting the ground clearance excluding the wheel area, it is possible to reduce the vehicle's erroneous determination.

Meanwhile, the disclosed exemplary embodiments may be embodied in the form of a recording medium storing instructions executable by a computer. The instructions may be stored in the form of program code, and when executed by a processor, may generate a program module to perform the operations of the disclosed exemplary embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a camera obtaining a surrounding image around the vehicle; and
   a controller connected to the camera and configured to determine spatial recognition data by learning the surrounding image of the vehicle as an input value of the controller,
   wherein controller is configured to determine object recognition data including wheel area data of a surrounding vehicle around the vehicle by learning the surrounding image of the vehicle as an input value of the controller, to determine a ground clearance between a bottom surface of a vehicle body of the surrounding vehicle and a ground by use of the spatial recognition data and the wheel area data, and to control the vehicle to park the vehicle according to the determined ground clearance, and
   wherein the controller is configured to apply the ground clearance to a remaining area excluding a wheel area of the surrounding vehicle.

2. The vehicle according to claim 1, wherein the controller is configured to correct a distance between the vehicle and the surrounding vehicle by reflecting the determined ground clearance.

3. The vehicle according to claim 1, wherein the object recognition data further includes at least one of the surrounding vehicle, bumper area data of the surrounding vehicle, and pedestrian data around the vehicle.

4. The vehicle according to claim 1,
   wherein the wheel area data includes first wheel area data and second wheel area, and
   wherein the controller is configured to determine the object recognition data including the first wheel area data and the second wheel area data upon determining that a first wheel and a second wheel of a same side of the surrounding vehicle are recognized by the controller, and to determine the ground clearance between the surrounding vehicle and the ground by use of the first wheel area data and the second wheel area data.

5. The vehicle according to claim 4, wherein the controller is configured to confirm a center of the ground in contact with the first wheel and a midpoint of a line segment passing through a midpoint of the ground in contact with the second wheel by use of the first wheel area data and the second wheel area data, and to determine the ground clearance by use of a length of a vertical line between a bottom surface of the vehicle body of the surrounding vehicle at the midpoint of the line segment.

6. The vehicle according to claim 1,
   wherein the wheel area data of the object recognition data includes first wheel area data and second wheel area data; and
   wherein the controller is configured to determine the object recognition data including the first wheel area data, the second wheel area data, and bumper area data upon determining that a first wheel and a second wheel on a same side of the surrounding vehicle and one of a bumper of a front surface or a rear surface of the surrounding vehicle is recognized by the controller, and to determine the ground clearance by use of the bumper area data, the first wheel area data and the second wheel area data.

7. The vehicle according to claim 6, wherein the controller is configured to confirm a center of the ground in contact with the first wheel and a straight line passing through the center of the ground in contact with the second wheel, and to determine the ground clearance by use of a length of a vertical line between the straight line and the recognized bumper.

8. The vehicle according to claim 1,
   wherein the wheel area data of the object recognition data includes first wheel area data; and
   wherein the controller is configured to determine the object recognition data including the first wheel area data upon determining that a first wheel of the surrounding vehicle is recognized by the controller, and to determine the ground clearance by use of the recognized first wheel area data.

9. The vehicle according to claim 8, wherein the controller is configured to convert a upper midpoint of the first wheel and a lower midpoint of the first wheel into world coordinate values, respectively, and to determine the ground clearance by determining a distance between the upper midpoint of the first wheel and the ground by use of the transformed world coordinate value and a height of the camera from the ground.

10. A control method of a vehicle, the control method including:
    determining, by a controller, spatial recognition data by learning a surrounding image of the vehicle as an input value of the controller;
    determining, by the controller, object recognition data including wheel area data of a surrounding vehicle around the vehicle by learning the surrounding image of the vehicle as an input value of the controller;
    determining, by the controller, a ground clearance between a bottom surface of a vehicle body of the surrounding vehicle and a ground by use of the spatial recognition data and the wheel area data;
    applying, by the controller, the ground clearance to a remaining area excluding a wheel area of the surrounding vehicle; and
    controlling, by the controller, the vehicle to park the vehicle according to the determined ground clearance.

11. The control method according to claim 10, further including:
    correcting, by the controller, a distance between the vehicle and the surrounding vehicle by reflecting the determined ground clearance.

12. The control method according to claim 10, wherein the object recognition data further includes at least one of the surrounding vehicle, bumper area data of the surrounding vehicle, and pedestrian data around the vehicle.

13. The control method according to claim 10,
    wherein the wheel area data of the object recognition data includes first wheel area data and second wheel area data, and
    wherein the method further includes:
      determining, by the controller, the object recognition data including the first wheel area data and the second wheel area data upon determining that a first wheel and a second wheel of a same side of the surrounding vehicle are recognized, by the controller; and determining, by the controller, the ground clearance between the surrounding vehicle and the ground by use of the first wheel area data and the second wheel area data.

14. The control method according to claim 13, further including:
confirming, by the controller, a center of the ground in contact with the first wheel and a midpoint of a line segment passing through a midpoint of the ground in contact with the second wheel by use of the first wheel area data and the second wheel area data; and
determining, by the controller, the ground clearance by use of a length of a vertical line between a bottom surface of the vehicle body of the surrounding vehicle at the midpoint of the line segment.

15. The control method according to claim 10,
wherein the wheel area data of the object recognition data includes first wheel area data and second wheel area data, and
wherein the method further includes:
determining, by the controller, the object recognition data including the first wheel area data, the second wheel area data and bumper area data upon determining that a first wheel and a second wheel on a same side of the surrounding vehicle and one of a bumper of a front surface or a rear surface of the surrounding vehicle is recognized by the controller; and
determining, by the controller, the ground clearance by use of the bumper area data, the first wheel area data and the second wheel area data.

16. The control method according to claim 15, further including:
confirming, by the controller, a center of the ground in contact with the first wheel and a straight line passing through the center of the ground in contact with the second wheel; and
determining, by the controller, the ground clearance by use of a length of a vertical line between the straight line and the recognized bumper.

17. The control method according to claim 10,
wherein the wheel area data of the object recognition data includes first wheel area data, and
wherein the method further includes:
determining, by the controller, the object recognition data including the first wheel area data upon determining that a first wheel of the surrounding vehicle is recognized; and
determine, by the controller, the ground clearance by use of the recognized first wheel area data.

18. The control method according to claim 17, further including:
converting, by the controller, an upper midpoint of the first wheel and a lower midpoint of the first wheel into world coordinate values, respectively; and
determining, by the controller, the ground clearance by determining a distance between the upper midpoint of the first wheel and the ground by use of the transformed world coordinate value and a height of a camera from the ground, the camera obtaining the surrounding image around the vehicle.

* * * * *